US007636648B2

(12) United States Patent

Johansson et al.

(10) Patent No.: US 7,636,648 B2

(45) Date of Patent: Dec. 22, 2009

(54) ARRANGEMENT, METHOD AND COMPUTER PROGRAM PRODUCT FOR ENHANCED PROGNOSTICS

(75) Inventors: Rikard Johansson, Linköping (SE); Torbjörn Fransson, Linköping (SE)

(73) Assignee: SAAB AB, Linköping (SE)

(*) Notice: Subject to any disclaimer, the term of this patent is extended or adjusted under 35 U.S.C. 154(b) by 98 days.

(21) Appl. No.: 11/896,886

(22) Filed: Sep. 6, 2007

(65) Prior Publication Data

US 2008/0059116 A1 Mar. 6, 2008

(30) Foreign Application Priority Data

Sep. 6, 2006 (EP) ................................. 06120192

(51) Int. Cl.
*G06F 11/30* (2006.01)
*G06F 15/00* (2006.01)

(52) U.S. Cl. ...................................................... 702/184

(58) Field of Classification Search .................. 702/91, 702/184
See application file for complete search history.

(56) References Cited

U.S. PATENT DOCUMENTS

| | | | | |
|---|---|---|---|---|
| 5,038,173 | A | 8/1991 | Kusumoto | |
| 6,059,191 | A | 5/2000 | Sedlak et al. | |
| 6,326,758 | B1 * | 12/2001 | Discenzo | 318/609 |
| 6,434,512 | B1 * | 8/2002 | Discenzo | 702/184 |
| 6,484,109 | B1 * | 11/2002 | Lofall | 702/56 |
| 2005/0254836 | A1 | 11/2005 | Takei | |
| 2006/0064291 | A1 * | 3/2006 | Pattipatti et al. | 703/14 |

FOREIGN PATENT DOCUMENTS

| | | | |
|---|---|---|---|
| DE | 19610070 | A1 | 9/1997 |
| DE | 10040456 | A1 | 5/2001 |
| DE | 10252329 | A1 | 5/2004 |
| FR | 2874807 | A1 | 3/2006 |
| WO | WO-01/61638 | A1 | 8/2001 |

OTHER PUBLICATIONS

European Search Report—Oct. 12, 2007.

* cited by examiner

*Primary Examiner*—Bryan Bui
(74) *Attorney, Agent, or Firm*—Venable LLP; Eric J. Franklin

(57) ABSTRACT

A method, a computer program product, a device and a monitoring arrangement for monitoring operation of an exchangeable unit in a machine. The monitoring arrangement includes at least one sensor, a control unit and a memory, that is arranged on the exchangeable unit.

18 Claims, 3 Drawing Sheets

ARRANGEMENT, METHOD AND COMPUTER PROGRAM PRODUCT FOR ENHANCED PROGNOSTICS

CROSS-REFERENCE TO RELATED APPLICATIONS

This application claims priority to European patent application 06120192.7 filed 6 Sep. 2006.

FIELD OF THE INVENTION

The invention relates to the field of the operation and maintenance of devices in a machine. Specifically, the invention relates to provide reliable prognostics concerning maintenance and operation of exchangeable units in a vehicle.

BACKGROUND TO THE INVENTION

In the field of vehicular industry the cost of maintenance and service is substantial. The cost due to erroneous equipment, i.e. devices that do not work properly, is very high, e.g. in the airline industry. A defective servo unit can lead to the cancellation of a flight, which may result in huge costs for an airline. Due to these high costs which are generated by defective devices an increasing interest for so called prognostics has developed. Prognostics involves a forecast of future performance and/or condition of a device. There are different measures of performance in the field of prognostics, these prognostic metrics may be, e.g. demonstrated versus design prognostics accuracy, demonstrated versus design prognostics horizon, demonstrated reliability of the prognostic system versus the system it monitors, applicability or robustness of the prognostic technique or system etc. The objective of the prognostics is to forecast when a unit/apparatus/component will break in order to replace the unit without interrupting an operation of a machine/vehicle. The prognostic function is implemented by continuously monitoring data and information about operation and operation conditions, the data is further stored in order to be evaluated. The data is used to predict the remaining useful life of a unit. When the prognostic function determines that the monitored unit is close to its maximum useful life an alarm may sound to an operator or by some other way attract the attention of the operator so that the unit may be replaced immediately or preferably at the next service opportunity.

The problem with this type of prognostics is that the amount of data of operation and operational conditions always has to be updated in relation to replacement/repair of the unit. The problem as such is that the data and the exchangeable units must be kept together in order for the prognostic function to work satisfactorily. For instance, a servo unit may contain ten O-rings. If, during a service check-up, five of these need to be replaced the operating time for the exchanged O-rings is set to 0, but for the remaining O-rings that have not been exchanged the operating time should be kept as it was before the service. Now, when the servo unit is sent back to the vehicle the updated data needs to be sent with the unit, e.g. stored on a separate disc, sent electronically to a control centre of the vehicle or the like, and downloaded into the electric system of the vehicle separately. This type of handling of data is time consuming and there is a risk that the unit and data gets separated wherein wrong data is fed into the system of the vehicle.

It is very hard to predict exactly how a servo unit will behave over a long period of time. It is therefore a desire to collect data from units that have broken down or serviced in order to understand how these units are degrading. This understanding can be used to enhance the prognostic function. The problem with this collection is that this requires data of a defective unit to be sent along with the unit. As mentioned before, there exists a risk that when the data and the unit are sent to a service park the data and the unit gets separated. Experience says that it is very hard for suppliers to get proper feedback of operational data from the technicians.

A further problem with gathering prognostics is that certain individual apparatuses sometimes have intermittently occurring errors which implies that when an apparatus has been dismounted from a vehicle due to e.g. that a test has indicated that an error has occurred in the apparatus, the error may not occur in tests when the apparatus has been dismounted from the vehicle. The result of this may be that the apparatus is sent back and forth between vehicle user and the supplier of the apparatuses, or repair shop, a numerous of times before the supplier can identify the error, which generates high costs for both the supplier as well as the user of the apparatus.

Document U.S. Pat. No. 6,343,252 discloses a system for collecting and analyzing data regarding the operation of gas turbines. The system includes a number of sensors monitoring the gas turbine and outputting operational data to a local computer. A remote database server periodically collects data from several on site systems for a plurality of gas turbines that can be used in a prognostic function. However, this system does not deal with or solves the problems stated above, i.e. that occurs when a part of the gas turbine or the whole turbine itself is dismounted and shipped of for service or repair.

Document WO, A1, 2004/061780 discloses another example of prior art in the field of prognostics. The disclosed system comprises a life indicator of a component of a machine. The life indicator comprises sensors configured to sense a property associated with the machine. The life indicator includes a memory element having a first data structure that determines a damage factor for the component of the machine based data from the sensors. When parts are repaired or replaced the information in the memory element may be reset to reflect the repaired or new state of the component. However, the memory element is maintained in the local interface 212 of the system and hence does not deal with the problems stated above. When, for example, a transmission part is dismounted and sent away for repair the stored data in the memory and the transmission part is separated.

The objective of the invention is to provide a system for prognostics wherein the data about the different components are as reliable as possible and the handling of the exchangeable units is simplified. This results in that the prognostics concerning the different components in an exchangeable unit are as accurate as possible.

SUMMARY OF THE INVENTION

The present invention solves the above stated problems by providing an arrangement; a method of collecting operation data; the use of such a method, a computer program product and an exchangeable unit. The objective of the present invention is achieved by providing a monitoring arrangement for collecting operational information of an exchangeable unit in a machine, wherein the monitoring arrangement comprises at least one sensor, a control unit and a memory, wherein the memory is arranged on the exchangeable unit.

The present invention further discloses a monitoring arrangement, wherein the memory comprises levels and logic in order to be able to generate maintenance reports.

Furthermore, in an embodiment of the present invention is at least one sensor arranged to record operational data.

In addition, the present invention discloses a monitoring arrangement, wherein the memory is arranged to receive and store events and data that are predefined and the events and data are configured to be used in a prognostic function.

Additionally, the present invention discloses an embodiment of a monitoring arrangement, wherein the monitoring arrangement comprises a plurality of sensors.

Moreover, the present invention discloses a monitoring arrangement, wherein at least one sensor may be associated with the exchangeable unit.

An embodiment of the invention discloses an monitoring arrangement, wherein the control unit is arranged locally on the exchangeable unit.

The control unit may be arranged to communicate with a central unit of the machine over a data link.

In an alternate embodiment the present invention discloses a monitoring arrangement comprising a control unit that is arranged as a central unit of the machine.

The present invention discloses a further monitoring arrangement wherein the control unit is configured to run a prognostic function of the machine.

The present invention further discloses an embodiment wherein a built-in-test is implemented to detect an error of a unit at a start up of the machine into the system. Thereby, the safety of the system is enhanced and the safety of the machine does not rely on the prognostic function.

Furthermore, the present invention relates to a method for collecting operational data of individual components in an exchangeable unit of a machine, comprising the steps of: sensing a property associated with the exchangeable unit; processing the property into operational data; and storing the operational data in a memory mounted on the exchangeable unit.

Additionally, the method according to the present invention discloses that operational data is stored according to levels and logic stored in the memory and is used to generate maintenance reports.

The method according to the present invention may also comprise the steps; recording events in the machine when a predefined event, stored in the memory, occurs in the exchangeable unit, and storing the recordings in the memory mounted on the exchangeable unit.

In addition, the present invention discloses a method wherein the recording events involves collecting and storing data from sensors associated with a part of the machine being different than the exchangeable unit.

Moreover may the method according to present invention comprise that the stored data in the memory is used in a prognostic function.

The prognostic function may run locally in a processor on the exchangeable unit.

Additionally, the present invention discloses an embodiment wherein the method comprises a prognostic function that is running on a central unit associated to the machine.

The method according to present invention may further comprise the steps of; dismounting the exchangeable unit from the machine, shipping the dismounted exchangeable unit to a maintenance entity, whereas parts of the exchangeable unit is serviced and/or repaired and wherein operational data concerning replaced/repaired parts is reset/adjusted in the memory.

In an embodiment of the present invention the method further comprises the step of; storing data concerning the different parts that has been serviced and/or repaired, associated with the operational data received from the memory, in order to update a prognostic function of the machine.

The present invention also discloses a method wherein an update of the prognostic function of the machine may be transferred to a processor running the prognostic function of the machine.

Furthermore, the present invention discloses a computer program product that is executed using a processor, thereby running a prognostic function of components and parts of a machine, using data that has been collected according the method disclosed above.

The prognostic function may be running locally on a processor on the exchangeable unit or may be running on a central unit associated with the machine.

The present invention further discloses the use of data that is stored in a memory of an exchangeable unit of a machine in a prognostic function, wherein the data has been collected according to the method described above.

The present invention further discloses an exchangeable unit of said arrangement, comprising a memory arranged on the exchangeable unit.

BRIEF DESCRIPTION OF THE DRAWINGS

The invention will be described in more detail below with reference to examples of embodiments and with reference to the attached drawings, of which

DETAILED DESCRIPTION OF EMBODIMENTS OF THE INVENTION

Figure 1:
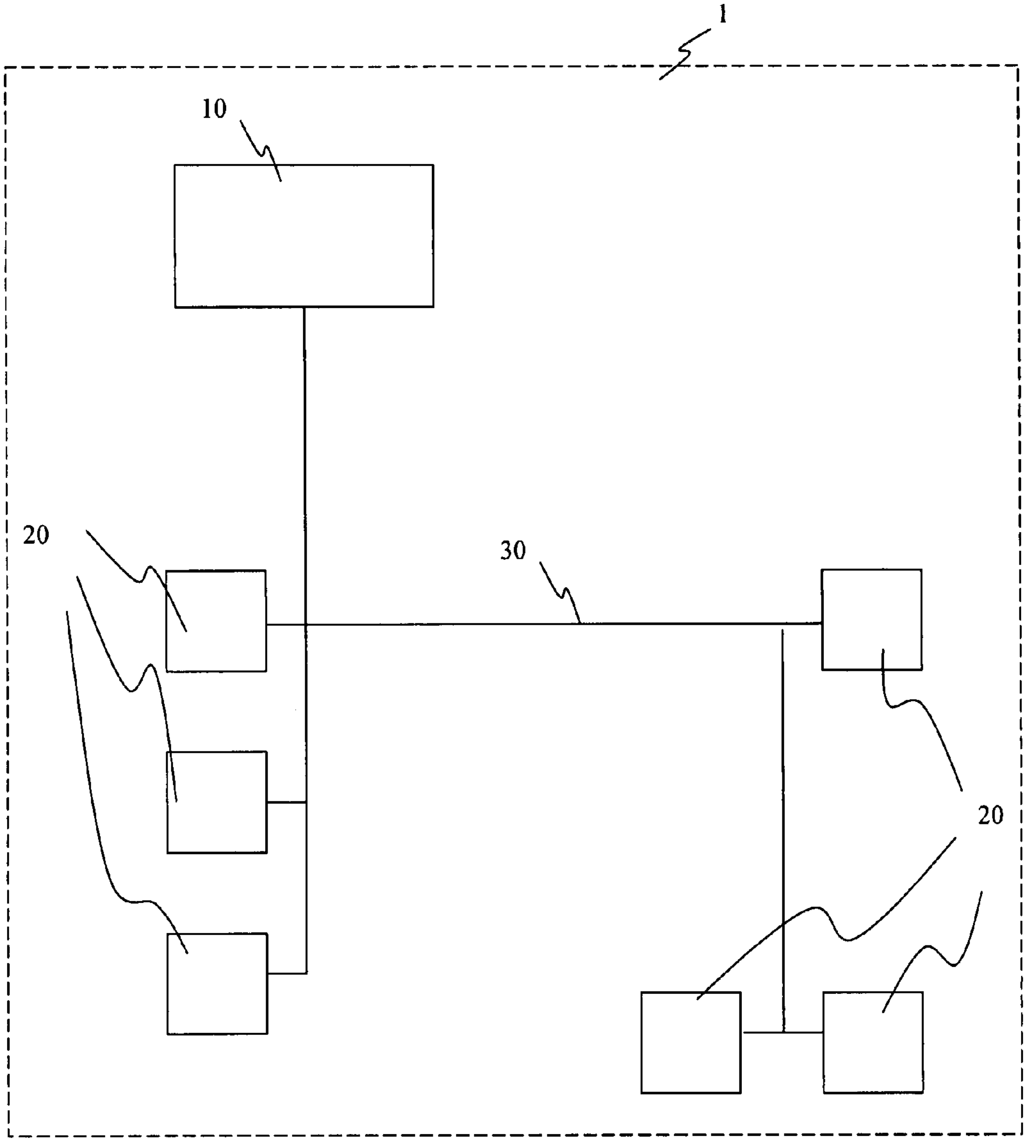
FIG. 1 shows a schematic overview of a monitoring system.

A solution to the above stated problems is to mount a memory on an exchangeable unit. In the memory operational information is stored. For a servo unit the memory stores e.g. the number of servo movements, temperature variations, pressure boosts, operating time for the individual components etc. The data is used in a prognostic function in order to predict and forecast errors occurring in the unit. Operational data, such as operational information and operational conditions, is continuously stored in the memory.

For safety reasons the prognostic function may be supplemented with a built in self test, i.e. a test that runs when initiating operation of the unit, e.g. when starting an airplane. The self test is run due to the fact that the prognostic function can not be trusted to always detect all errors. If this traditional self test detects an error the unit will be replaced and shipped of to be repaired or replaced. It should here be understood that if the prognostic function fails to forecast that an exchangeable unit will fail, the built in test detects the error in the exchangeable unit and a large amount of data concerning the fault and the operation that preceded the error is stored in the memory of the exchangeable unit. This data is then used to update the prognostic function in order to be able to foresee a similar event, that is, the data is used to understand why the prognostic function did not foresee the occurring error. Due to this updating of the prognostic function the function in itself will be enhanced and more reliable.

As mentioned before and described in FIG. 3, the exchangeable unit is shipped away for service or repair during an operational stop of the vehicle. When the exchangeable unit is received by the service organization information/data stored in the memory mounted on the exchangeable unit is read and sent for analysis. The data containing operational information and history may not only be used when troubleshooting but also in order to enhance the prognostic function. The supplier of the prognostic function will be able to continuously provide updates of the prognostics to airlines against a fee in order to enhance the prognostic function from what the contractual agreement states. The prognostic function in an airplane must be formed in a manner such that it can be updated without requiring that systems in the airplane that are involved in the prognostic function have to be recertified. In an embodiment of the invention this object is achieved by separating the built in self test and the prognostic function, that is, even if an update of the prognostic function results in that the prognostic function fails to detect faults, these faults will be detected by the built in test, and proper warnings will be given to the operator. Having the prognostic function separated from the built in test results in that the prognostic function does not need to be certified due to the fact that is does not influence the safety of the vehicle, and by not requiring the prognostic function to be recertified each time it has been updated, the updating of the prognostic function will be facilitated. It should here be understood that the costs that arises from the requirement of certification is also omitted, i.e. the prognostic function is set as an level E according to the RTCA/DO-178B, which means that the software does not require recertification when updated. In an embodiment of the invention the updates used in a prognostic function is continuously transferred from a supplier to users of the prognostic function; a service that the supplier of the updates can charge users of prognostic functions for.

As a part of a service the data contained in the memory is modified according to what has been altered during the service or repair, e.g. if three out of ten O-rings are exchanged in a unit during repair the data in the memory regarding these three O-rings is modified, whereas the data concerning the other O-rings, the non-repaired, is left unmodified.

The memory should also be able to include definitions (level and/or logic) to be able to generate maintenance reports in the vehicle. These definitions may then be adjusted based on operational experience. An example of theses definitions will now be explained. When a servo unit has performed a predetermined number of meters of movements, where a meter of movement is defined as:

meter of movement=actual movement*temp_factor;

where temp_factor is:

servo temp<−10° C.: temp_factor=3 servo temp>−10° C.: temp_factor=2 servo temp>40° C.: temp_factor=1 servo temp>90° C.: temp_factor=2, an alarm sounds to attenuate the operator that the servo has only a certain number of hours of operation left before it should be serviced in order to avoid unscheduled maintenance.

In order to solve to problem with the intermittently occurring errors the memory may also be used to record occurring events, i.e. the memory is programmed so that functions in the vehicle record certain signals in case of certain events. In an embodiment of the invention a unit that is affected by intermittently occurring errors, a specially formed recording logic is created in order to not send the unit back and forth between the supplier and the vehicle staff. When one suspects that an error occurs due to a loose contact between the power feeder and the servo, recording logic may be set up. The recording logic may be e.g. sample the voltage with 1000 Hz, store the sample in a buffer in order to always have the last second voltage recorded. If an error occurs the recording is stopped and the voltage of the last second is available. These recordings are stored in the memory and may, if the error reoccurs, be used by the supplier in order to analyse the intermittent occurring error.

An embodiment of the invention will now be described referring to the drawings. Referring to FIG. 1, an electrical system for a machine is shown. The machine may be any kind of machine, such as a vehicle, a power generator, a manufacturing machine or the like. In the exemplary embodiment shown, the machine is an airplane. The electrical system includes monitoring arrangements 20, which include or are connected to sensors for monitoring and recording property factors that may be considered when determining prognostics. Different monitoring arrangements 20 monitor different exchangeable units of the airplane. For example, the monitoring arrangements in the electrical system may include a servo monitoring arrangement, a landing gear monitoring arrangement or the like (all denoted as 20). Further monitoring arrangements may be associated with other monitoring arrangements, such as cooling systems monitoring arrangement, i.e. a monitoring arrangement may collect information from sensors arranged on other exchangeable units. The electrical system further comprises a central unit 10 that gathers all the information/data concerning the airplane and its different parts. The information from the different monitoring arrangements 20 is sent along a data link 30 to the central unit 10 as well as to other monitoring arrangements if data from a certain monitoring arrangement is needed in another monitoring arrangement. The central unit may contain computer components such as memory components, processors for recording data from the monitoring arrangements 20 etc. The central unit may further contain components to provide a user interface for allowing an operator to manually input and operate the central unit 10. In an embodiment of the invention a prognostic function is running in the central unit 10 using data from the monitoring arrangements. In an alternate embodiment the prognostic function is running on a computer localised externally of a machine being monitored, wherein the data may be sent over the air. The prognostic function may also be running locally on a control unit mounted on the exchangeable unit.

The central unit contains definitions when an alarm should sound based on levels and logic and uses the memory of the exchangeable unit to store all specific parameters for a unit, e.g. number of servo movements, temperature variations, operational hours and the similar. The central unit may further contain definitions on what should be stored on the memory in order to collect data to enhance the prognostic function. The central may also monitor the exchangeable unit according to definitions of specific operational data in order to detect intermittently occurring events and to store data according to the definitions in the memory of the exchangeable unit.

It should be noted that all the processes and tasks performed by the central unit may be performed by a control unit, as stated below, arranged locally on the exchangeable unit.

Figure 2:
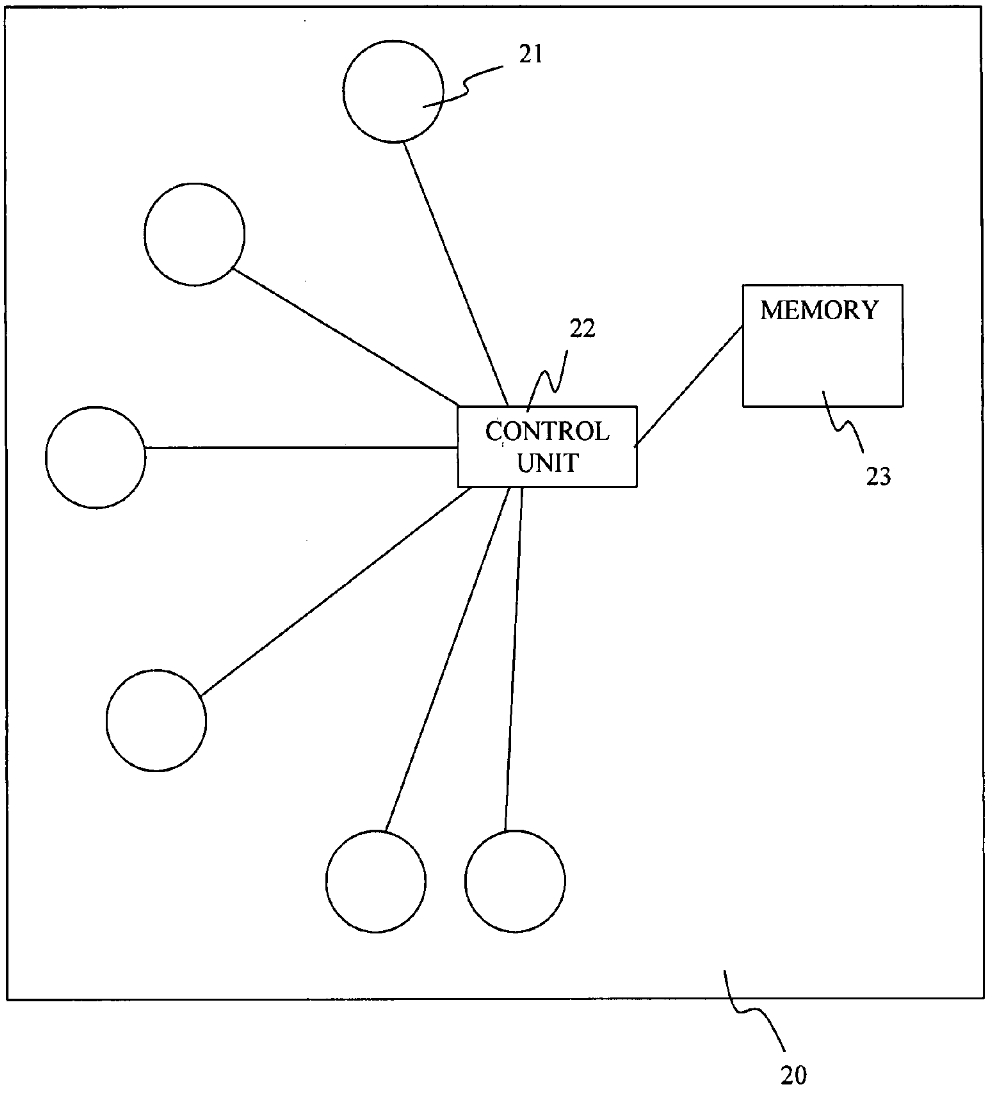
FIG. 2 shows a schematic overview an arrangement according to an embodiment of the invention.

Referring to FIG. 2, an embodiment of the invention is shown. FIG. 2 discloses a servo monitoring arrangement 20 comprising servo sensors 21, such as, for example, an atmospheric pressure sensor, a boost pressure sensor, a temperature sensor, a servo movement sensor etc, which collects data of the servo. These sensors provide either a direct measurement of a parameter such as atmospheric pressure or a measurement that may serve as a factor in a parameter, such as a movement sensor that records movement of the servo in order to count the number of servo movements or the like. The different data from the sensors are used in order to obtain a reliable prognostic function that suggests when to perform maintenance and service in order to prevent unplanned interruptions. It should here be noted that same sensors may be used in different monitoring arrangements such as pressure sensors and the like.

The data from the sensors are collected and processed by a control unit 22 in the monitoring arrangement 20 to provide processable data. It should here be understood that the control unit 22, may be embodied in a numerous ways, such as a CPU, FPGA, converter or the like. In an embodiment of the invention the control unit is implemented in the central unit 10 of the electrical system described in FIG. 1. The monitoring arrangement 20 further comprises a memory 23, which is in communication with the control unit 22. The memory stores data from the sensors and may include data structures, such as logic and levels, to be able to generate maintenance rapports in the vehicle. The memory may also be used to record events that are occurring, i.e. functions in the vehicle record certain signals in case of certain events, and these recordings are stored in the memory in order to be able to know the conditions when a fault has occurred. These events are gathered and processed by a supplier of the exchangeable unit in order to restore the conditions when the fault occurred.

Comprehensively, the memory mounted on the exchangeable unit is used for:

- Storing operational data (that may be used to enhance the prognostic function) according to the specification of the prognostic function running on the central unit, i.e. data that is used to set up the prognostic function.
- Storing operational data that is used in a running prognostic function, e.g. data that will indicate that a part is close to its maximum useful life.
- Storing specific operational data according to the definition in the memory of the exchangeable unit, e.g. used to solve intermittently occurring errors.
- Storing new updated prognostic functions that will be uploaded to the central unit of the machine in order to change the monitoring of all the similar units will be updated, e.g. an installed serviced servo unit has a updated prognostic function for servo units stored in the local memory, this updated prognostic function is uploaded to a central unit of the vehicle and is used for all servo units in the vehicle.

It should be understood that the memory may be arranged to be able to get dismounted when being read or exchanged when broken down.

In an embodiment of the invention an exchangeable unit comprises its own sensors 21, or only receives data from sensors placed externally of the exchangeable unit. The sensors are connected to the central unit 10 of the electrical system 1 either via data bus link, network, wireless communication, analogue or discrete leads. The data stored in the memory 23 of the arrangement as well as data from sensors 21 are uploaded/downloaded to/from the central unit 10, where the data is used. In an embodiment of the invention the central unit also receives data from sensors positioned externally of exchangeable units, such as sensors that record temperature, vibrations in the vehicular body and the like.

In another embodiment of the invention the exchangeable unit comprises sensors, which are connected to the control unit, in this embodiment a CPU, central processing unit, integrated into the exchangeable unit. The CPU may be able to establish maintenance reports and prognostics; basically the CPU can perform all the features of a central unit 10. The CPU receives data from the sensors and stores the data in the memory. The data is used in prognostic functions and the like. Consequently, a prognostic function of an exchangeable unit may be running on a computer integrated on the exchangeable unit.

In an alternate embodiment a processor in the central unit 10 processes all the data from all sensors in the vehicle. The processed data concerning a certain exchangeable unit is stored locally on the memory of the exchangeable unit, it should here be noted that some data may be stored on the central unit as well. The stored data in the memory of the exchangeable unit may then be used when the exchangeable unit undergoes service or the like, to update a prognostic function as stated below. When service renders in new updated data in the memory concerning parts in the exchangeable unit, e.g. when a part has been replaced, the data is uploaded to the central unit when the exchangeable unit is returned to its position in the vehicle.

In an embodiment of the invention an exchangeable unit comprises a mounted memory on the exchangeable unit and a connection part, e.g. a connecting plug, USB-port, a transceiver, a transmitter, a receiver or the like, that enables the memory to hook up to a communications link, wirelessly, by wire or the like, to the central unit.

Figure 3:
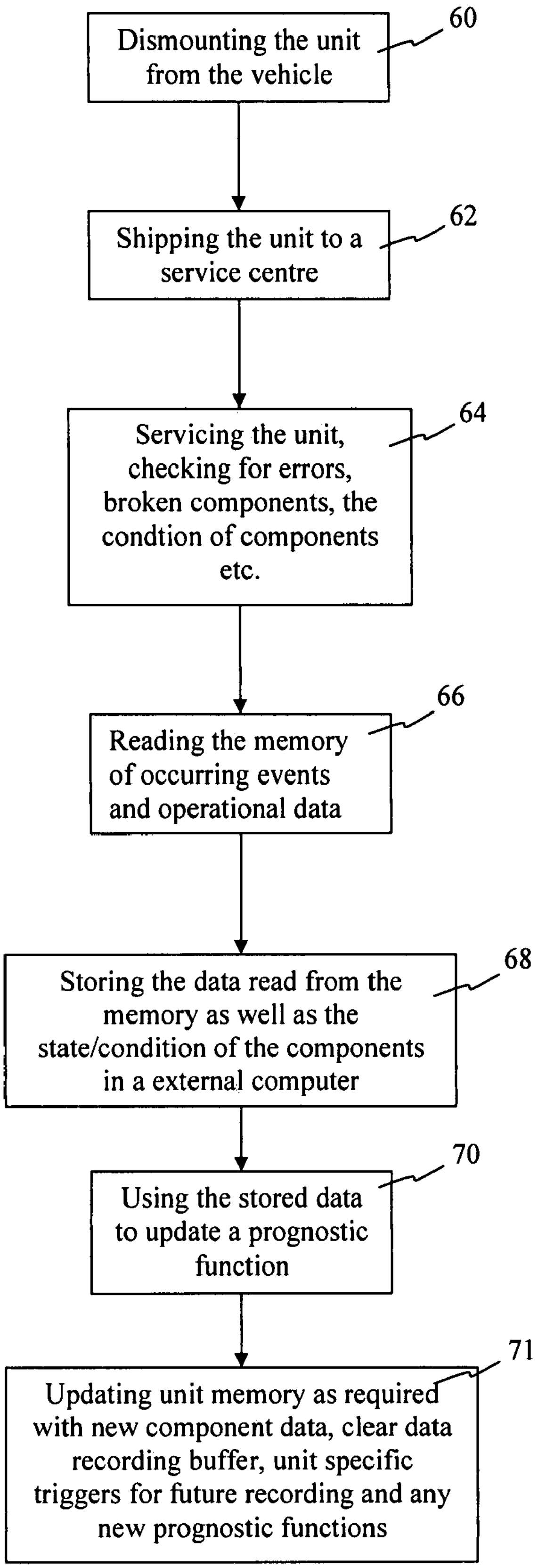
FIG. 3 discloses a schematic block diagram of a method of collecting operational data.

Referring to FIG. 3, a method of collecting information to update data of a prognostic function is shown. In step 60, after an indication/break down or the similar that an error has occurred in a unit, e.g. a servo unit as in the example above, the unit is dismounted from the machine and shipped off to the supplier of service of such units, as stated in step 62. It is this supplier that also may be the supplier of the prognostic function or is in cooperation with a company that provides prognostic functions. In step 64 the unit is checked by the service staff to collect information about parts that are worn, the condition of the different parts, broken parts, errors that have been reported and the like. This information is gathered and stored along with the information taken from the memory. The memory is read, e.g. by plugging the unit into a computer or the like. The data that is read contains operational data, event data etc. whatever the memory contains, as stated in step 66. As stated the data read from the memory is then stored along with the information gathered from the service check, see step 68. Taken the above stated example with the three worn out O-rings; the service staff read the data from the memory 23 of the service unit, such as number of servo movements, temperature variations, operational hours etc, since the O-rings where last exchanged. This data is stored along with the information that the O-rings where worn to the point that they needed to be replaced into the prognostic function, step 70. This results in that when an airplane under similar operational conditions as read from the memory 23 uses the prognostic function supplied from the supplier, the operator of the airplane will get an indication that the servo unit needs to undergo service. When the service staff has exchanged the O-rings, the service staff resets the operational data of these O-rings in the memory 23 but leaves the data of the non-replaced details unmodified. It should here be noted that this type of updating of prognostics may contain a large amount of data that may be gathered from instruments or the like.

Before the unit is sent back to the airline, the memory on the exchangeable unit is updated with information, such as new component data, clear data recording buffer, updated with any unit specific triggers for future recording and any new prognostic functions, as stated in step 71.

When the servo unit is returned to the plane, the central unit of the plane 10 collects the information from the servo unit and may receive the updated prognostics either over the air, satellite network, e.g. Internet, mail or the like; or on a record-able media such as a disc, external memory or the like. It should be understood that the updated prognostic function data may be stored by the service staff on the local memory 23 arranged on the servo unit. When the servo unit 20 is reinstalled in the vehicle and plugged into the data link 30, an update of the prognostic function data is applied.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. A monitoring arrangement for monitoring operation of an exchangeable unit in a machine, the monitoring arrangement comprising:

at least one sensor configured to sense operational information and operational conditions of the exchangeable unit, a control unit, and a memory arranged on the exchangeable unit and configured to store and receive events and data regarding operational information and operational conditions for the exchangeable unit, wherein the data and events are predefined and configured to be used in a prognostic function, wherein the control unit is configured to run a prognostic function using the stored data and events, and wherein the prognostic function is arranged to predict and forecast errors occurring in the exchangeable unit based on the stored events and data.

2. The monitoring arrangement according to claim 1, wherein the memory comprises levels and logic in order to be able to generate maintenance reports.

3. The monitoring arrangement according to claim 1, wherein the at least one sensor is arranged to record operational data.

4. The monitoring arrangement according to claim 1, further comprising:

a plurality of sensors.

5. The monitoring arrangement according to claim 1, wherein the at least one sensor is associated with the exchangeable unit.

6. The monitoring arrangement according to claim 1, wherein the control unit is arranged locally on the exchangeable unit.

7. The monitoring arrangement according to claim 6, wherein the control unit is arranged to communicate with a central unit of the machine over a data link.

8. The monitoring arrangement according to claim 1, wherein the control unit is arranged as a central unit of the machine.

9. The monitoring arrangement according to claim 1, wherein a built in test with safety critical functions is configured to run on the control unit separated from the prognostic function.

10. A method for collecting operational data of a machine that comprises at least one exchangeable unit, the method comprising:

sensing with at least one sensor a property associated with the operation of the machine;

processing the property into operational data;

storing the operational data in a memory mounted on the at least one exchangeable unit;

recording events in the machine when a predefined event, stored in the memory, occurs in the at least one exchangeable unit;

storing the recorded events in the memory mounted on the at least one exchangeable unit;

storing the operational data and the recorded events retrieved from the memory of the at least one exchangeable unit;

storing informative data, whereas parts of the exchangeable unit has been serviced, replaced and/or repaired, concerning the replaced/repaired parts;

updating a prognostic function of the machine based on the stored operational data, the recorded events and the informative data, wherein said prognostic function is arranged to predict and forecast errors occurring in the at least one exchangeable unit based on said operational data; and resetting or adjusting operational data concerning the parts that has been serviced and/or repaired in the memory of the exchangeable unit.

11. The method according to claim 10, wherein the operational data is stored according to levels and logic stored in the memory used to generate maintenance reports.

12. The method according to claim 10, wherein the recording events comprises collecting and storing data from sensors associated with a part of the machine being different than the exchangeable unit.

13. The method according to claim 10, further comprising:

dismounting the exchangeable unit from the machine;

shipping the dismounted exchangeable unit to a maintenance entity, and storing operational data concerning different parts of the dismounted exchangeable unit retrieved from the memory of the exchangeable unit.

14. The method according to claim 10, wherein an update of the prognostic function of the vehicle is transferred to a processor running the prognostic function of the machine.

15. The method according to claim 10, further comprising:

servicing, replacing and/or repairing the exchangeable unit based on the prognostic function.

16. A computer program product, comprising:

a computer readable medium; and computer program instructions recorded on the computer readable medium and executable by a processor, to make a computer operable to carry out a method comprising sensing a property associated with the operation of the machine, processing the property into operational data, storing the operational data in a memory mounted on the at least one exchangeable unit, recording events in the machine when a predefined event, stored in the memory, occurs in the at least one exchangeable unit, storing the recorded events in the memory mounted on the at least one exchangeable unit, storing the operational data and the recorded events retrieved from the memory of the at least one exchangeable unit, storing informative data, whereas parts of the exchangeable unit has been serviced, replaced and/or repaired, concerning the replaced/repaired parts, updating a prognostic function of the machine based on the stored operational data, the recorded events and the informative data, wherein said prognostic function is arranged to predict and forecast errors occurring in the at least one exchangeable unit based on said operational data, and resetting or adjusting operational data concerning the parts that has been ser viced and/or repaired in the memory of the exchangeable unit.

17. The computer program product according to claim 16, wherein the prognostic function is running locally on a processor on the exchangeable unit.

18. The computer program product according to claim 16, wherein the prognostic function is running on a central unit associated to the machine.

* * * * *